(12) United States Patent
Heinen et al.

(10) Patent No.: US 11,518,520 B2
(45) Date of Patent: Dec. 6, 2022

(54) AIRCRAFT SEAT AND CABIN ARRANGEMENT

(71) Applicant: Safran Seats GB Limited, Cwmbran (GB)

(72) Inventors: Clement Aart IJje Heinen, Rotterdam (NL); Iris Michelle Groot Koerkamp, Delft (NL); Bart Franciscus Verhees, Delft (NL); Roel Waltherus Hendrikus Albertus Tibosch, Delft (NL); Tibbe Titulaer, Rotterdam (NL)

(73) Assignee: Safran Seats GB Limited, Cwmbran (GB)

( * ) Notice: Subject to any disclaimer, the term of this patent is extended or adjusted under 35 U.S.C. 154(b) by 0 days.

(21) Appl. No.: 17/289,916

(22) PCT Filed: Oct. 29, 2019

(86) PCT No.: PCT/GB2019/053048
§ 371 (c)(1),
(2) Date: Apr. 29, 2021

(87) PCT Pub. No.: WO2020/089600
PCT Pub. Date: May 7, 2020

(65) Prior Publication Data
US 2022/0001992 A1  Jan. 6, 2022

(30) Foreign Application Priority Data

Oct. 30, 2018  (GB) .................................... 1817722

(51) Int. Cl.
*B64D 11/06* (2006.01)
(52) U.S. Cl.
CPC ........ *B64D 11/064* (2014.12); *B64D 11/0605* (2014.12); *B64D 11/0611* (2014.12); *B64D 11/0643* (2014.12)

(58) Field of Classification Search
CPC .............. B64D 11/064; B64D 11/0605; B64D 11/0611; B64D 11/0643
See application file for complete search history.

(56) References Cited

U.S. PATENT DOCUMENTS

| 1,732,782 A | 10/1929 | Wasmuth |
| 5,179,447 A | 1/1993 | Lain |

(Continued)

FOREIGN PATENT DOCUMENTS

| CN | 107097960 A | 8/2017 |
| CN | 109677619 A | 4/2019 |

(Continued)

OTHER PUBLICATIONS

International Patent Application No. PCT/GB2019/053048, International Search Report and Written Opinion, dated Feb. 3, 2020.

(Continued)

*Primary Examiner* — Anthony D Barfield
(74) *Attorney, Agent, or Firm* — Kilpatrick Townsend & Stockton LLP (57) ABSTRACT

An aircraft passenger seat comprising a seat pan, a back rest, and a leg rest is provided. The back rest is moveable between an upright position and a reclined position in which the back rest is substantially parallel with a deployed position of the seat pan. The back rest can also be fixed in at least one intermediate position between the upright position and the reclined position. The leg rest is moveable between a retracted position in which the leg rest is substantially perpendicular to the deployed position of the seat pan and an extended position in which it is positioned to support the legs of a passenger. The seat pan is moveable between a deployed position in which the seat pan occupies a first space and wherein a passenger can sit on the seat pan, and (Continued)

a stowed position in which the seat pan is moved out of the first space such that a passenger can stand in the first space.

14 Claims, 6 Drawing Sheets

(56) References Cited

U.S. PATENT DOCUMENTS

| | | | |
|---|---|---|---|
| 6,375,259 | B1 | 4/2002 | Ma |
| 2008/0100112 | A1 | 5/2008 | Hausler et al. |
| 2009/0322134 | A1 | 12/2009 | Yamada et al. |
| 2010/0060060 | A1 | 3/2010 | Hansen |
| 2014/0368012 | A1 | 12/2014 | Burd |
| 2016/0376007 | A1 | 12/2016 | Meindlhumer |
| 2017/0129611 | A1 | 5/2017 | Morgan |

FOREIGN PATENT DOCUMENTS

| | | | | |
|---|---|---|---|---|
| DE | 102011077773 | A1 | 12/2012 | |
| EP | 0349762 | A2 | 1/1990 | |
| EP | 1645507 | A1 | 4/2006 | |
| EP | 3072815 | A1 | 9/2016 | |
| EP | 3446976 | A1 | 2/2019 | |
| FR | 622622 | A | 6/1927 | |
| FR | 2838085 | A1 * | 10/2003 | ............... B60N 2/22 |
| GB | 2213368 | A | 8/1989 | |
| GB | 2337925 | A | 12/1999 | |
| GB | 2563051 | A | 12/2018 | |
| JP | H 11-59249 | | 3/1999 | |
| WO | 2005095210 | A1 | 10/2005 | |
| WO | 2015/014258 | | 2/2015 | |
| WO | 2017050912 | A1 | 3/2017 | |
| WO | 2017080939 | A1 | 5/2017 | |

OTHER PUBLICATIONS

United Kingdom Patent Application No. 1817722.0, Search Report, dated Apr. 29, 2019.
United Kingdom Patent Application No. 1817722.0, Search Report, dated Aug. 5, 2019.
United Kingdom Patent Application No. 1817722.0, Patent Examination Report, dated May 4, 2022, 6 pgs.

* cited by examiner

AIRCRAFT SEAT AND CABIN ARRANGEMENT

CROSS-REFERENCE TO RELATED APPLICATIONS

This application is a national stage application of International Patent Application PCT/GB2019/053048, filed on Oct. 29, 2019 and titled "Aircraft Seat and Cabin Arrangement," which is related to and claims priority benefits from United Kingdom Patent Application No. 1817722.0, filed on Oct. 30, 2018 and titled "Aircraft Seat and Cabin Arrangement," both of which are hereby incorporated by reference in their entireties.

FIELD OF THE INVENTION

The present invention concerns an aircraft seat. More particularly, but not exclusively, this invention concerns a sit-stand aircraft seat, a seat unit comprising an adjustable screen, and a seat unit comprising an adjustable table. The present invention also concerns an aircraft cabin comprising such seats and seat units.

BACKGROUND OF THE INVENTION

The main activities undertaken by a business class traveller during flight are working and sleeping. Prior art aircraft passenger seats typically provide such a traveller with an upright seating mode that can be used to work from and a bed mode in which the aircraft seat reclines to a horizontal, or near-horizontal position for sleeping.

An aircraft seating arrangement having greater flexibility is desirable as the traveller may wish to work in a range of positions, as is usually possible within the modern office environment, especially during long haul flights where extended periods of time are spent on board. Furthermore, the most comfortable seating position may be dependent on a particular passenger's size and stature, as well as personal preference, which means that an aircraft seating arrangement providing a variety of configuration options is more desirable to the passenger than a "one size fits all" arrangement.

The present invention seeks to mitigate the above-mentioned problems.

SUMMARY OF THE INVENTION

The present invention provides, according to a first aspect, an aircraft passenger seat comprising a seat pan and a back rest, wherein the seat pan is moveable between a deployed position in which the seat pan occupies a first space and wherein a passenger can sit on the seat pan, and a stowed position in which the seat pan is moved out of the first space such that a passenger can stand in the first space, and wherein the back rest is moveable between an upright position and a reclined position.

The term "upright" may correspond to a vertical position. However, it will also be understood by the skilled person to correspond to a position in which the back rest is oriented at an angle to the vertical. The term "vertical" here being with reference to a floor of an aircraft cabin to which the aircraft passenger seat is mounted in use. The seat may comprise a headrest.

The present invention recognises that an aircraft passenger may not want to remain seated for the entire duration of a journey but that there is limited space within an aircraft for a passenger to stand. As such the present invention provides a sit-stand aircraft seat which is configurable between an upright sitting (seat pan deployed) position in which a passenger can sit upon seat pan with their back against the back rest, a reclined sitting (seat pan deployed) position in which the passenger can sit upon the seat pan with their back against the back rest in a reclined position, and a standing (seat pan stowed) position. In order to maximise limited aircraft cabin space, in the stowed position the seat pan has moved so that the passenger can stand in space that was occupied by the seat pan in the sitting (seat pan deployed) position.

The aircraft passenger seat may be a business class aircraft passenger seat. The sit-stand function of the aircraft passenger seat is particularly advantageous for business class seating. A business class passenger may want to work for periods of time in a standing up position, as can be done in modern office environments, particularly during long-haul flights in which the time that is spent on board is significant.

In the reclined position, the back rest may be substantially parallel with the deployed position of the seat pan. The back rest may be able to be fixed in at least one intermediate position between the upright position and the reclined position. The back rest may be able to be fixed in a plurality or multiplicity of positions between the upright position and the reclined position. The reclined position may correspond to a bed configuration. The main in-flight activities of a typical business class traveller are working and sleeping. Therefore it is it is particularly advantageous to provide a sit-stand seat that also has a bed configuration.

The seat pan may be moveable between the deployed position and a tilted position in which seat pan is angled with respect to the back rest. An angle may be defined between the seat pan and back rest and the seat pan may be tilted to increase or decrease the angle. The seat pan may be tiltable towards the back rest to decrease the angle. The seat pan may be tiltable away from the back rest to increase the angle. A tiltable seat pan provides the seat with extra versatility, allowing the passenger to change their sitting position during flight by changing the angle of the seat pan.

The seat pan may be able to be fixed in at least one intermediate position between the deployed position and tilted position. The seat pan may be able to be fixed in a plurality or multiplicity of positions between the deployed position and tilted position.

The aircraft passenger seat may further comprise a leg rest that is moveable between a retracted position in which it is substantially perpendicular to the seat pan and an extended position in which it is positioned to support the legs of a passenger. The leg rest may be positioned substantially parallel with the seat pan in the extended position. The leg rest may be able to be fixed in at least one intermediate position between the retracted position and the extended position. The leg rest may be rotatably mounted to the seat pan and moveable between the retracted position and the extended position by rotation of the leg rest with respect to the seat pan. The seat pan may comprise a front edge and a rear, opposite edge. The seat pan may meet the back rest at the rear edge and the leg rest may be mounted upon the seat pan at or near the front edge.

The seat pan may be able to be fixed in a plurality of positions between the deployed position and the tilted position. The back rest may be able to be fixed in a plurality of positions between the upright position and the reclined position. The leg rest may be able to be fixed in a plurality of positions between the retracted position and the extended position. This arrangement is particularly advantageous because the passenger is provided with a large variety of combinations of the relative positions of the seat pan, back rest, and leg rest. For example, the passenger may choose to sit in the so-called "zero gravity" sitting position in which the passenger is supported in a position between sitting down and lying flat in which the passenger's back is reclined and their knees positioned above their waist. This position provides a feeling of weightlessness and supports the body in an ergonomic way. The most comfortable zero-gravity seating position is largely dependent on the size and stature of the passenger as well as personal preference. As such, it is particularly beneficial to have a large number of configurations of the seat.

According to a second aspect, the present invention provides an aircraft passenger seat comprising a seat pan and a back rest, wherein the seat pan comprises a seating surface on a first side of the seat pan, and wherein the seat pan is moveable between: a deployed position in which the seat pan occupies a first space and wherein a rear edge of the seat pan is adjacent the back rest and a passenger can sit on the seating surface of seat pan, and a stowed position in which the seat pan is moved out of the first space such that a passenger can stand in the first space, and wherein the seat pan is configured to move from the deployed position to the stowed position by rotating the seat pan such that the rear edge of the seat pan rotates away from the back rest.

The rear edge of the seat pan may move upwardly in relation to back rest when moving from the deployed position to the stowed position. The seat pan may comprise an underside on a second, opposite side of the seat pan. The underside of the seat pan may, in use, face the floor of the aircraft cabin when the seat pan is in the deployed position. The underside of the seat pan may rotate towards the back rest when the seat pan moves between the deployed position and the stowed position. The underside of the seat pan may face the back rest when the seat pan is in the stowed position.

The seat pan may be configured to rotate about an axis to move the seat pan from the deployed position to the stowed position, wherein the axis is positioned towards or at a front edge of the seat pan, the front edge of the seat pan being located on the opposite side of the seat pan to the rear edge of the seat pan. The axis may be positioned closer to the front edge of the seat pan than to the rear edge of the seat pan.

The seat may comprise a leg rest mounted to the seat pan, in a region of the front edge of the seat pan. The leg rest may be mounted to the front edge of the seat pan. The leg rest may move towards the back rest as the seat pan moves from the deployed position to the stowed position. The leg rest may not rotate as the seat pan moves from the deployed position to the stowed position. The leg rest may move substantially only in one plane as the seat pan moves from the deployed position to the stowed position. The leg rest may move substantially horizontally, but not vertically, as the seat pan moves from the deployed position to the stowed position.

The particular way in which the seat pan is configured to rotate is particularly advantageous where the aircraft seat comprises a leg rest because as the seat pan rotates from the deployed position to the stowed position, the leg rest rotates with the seat pan towards the back rest. If the sit-stand seat were instead to use, for example, a cinema seat-style flip-up arrangement wherein the seat pan was configured to rotate about an axis at the rear edge of the seat pan, the leg rest would move upwardly and away from the back rest before moving back towards the back rest as the seat pan rotates towards the stowed position. As such, a passenger stood in front of the seat as it rotates to the stowed position would have to move out of the way of the leg rest, such an arrangement is particularly inconvenient given the limited space that is typically available within an aircraft cabin. Furthermore, a cinema seat-style flip-up arrangement would also require some sort of mechanism to move the leg rest to ensure that standing space is maximised. Therefore the presently disclosed sit-stand mechanism is potentially much simpler than that would be needed for a flip-up-type seat.

The leg rest may be substantially aligned with the seat pan and positioned below the seat pan when the seat pan is in the stowed position. The seat pan may be positioned substantially parallel with the leg rest when the seat pan is in the stowed position. The seat pan may be substantially parallel with the back rest when the seat pan is in the stowed position.

According to a third aspect, the present invention provides an aircraft passenger seat unit comprising an aircraft passenger seat according to either of the first aspect or second aspect of the invention.

According to a fourth aspect, the present invention provides an aircraft passenger seat unit comprising a seat and a table, wherein the seat comprises a seat pan moveable between: a deployed position in which the seat pan occupies a first space and wherein a passenger can sit on the seat pan, and a stowed position in which the seat pan is moved out of the first space such that a passenger can stand in the first space, and wherein the table is moveable between: a lowered position in which a passenger can use the table while sitting upon the seat pan, and a raised position in which the passenger can use the table while standing in the first space.

The table may be moveable with respect to the seat. The table may be moveable from side-to-side with respect to the seat. The table may be moveable towards or away from the seat. The table may be tiltable with respect to the seat. The table may comprise hinges so that at least a portion of the table is tiltable via hinges.

As mentioned, a business class passenger may want to work for periods of time in a standing up position, as can be done in modern office environments, particularly during long-haul flights in which the time that is spent on board is significant. The present invention therefore provides a sit-stand desk as which the passenger can work whilst sitting or standing.

The table may comprise an integrated display screen control device, such as a keyboard or trackpad. The display screen control device may be configurable to connect to a personal electronic device such as a tablet or laptop using a wireless or wired connection. The display screen control device may be configurable to connect to an onboard computer using a wireless or wired connection. The table may comprise both a keyboard and a trackpad.

According to a fifth aspect, the present invention provides an aircraft passenger seat unit comprising a seat and a display screen, wherein the seat unit further comprises a telescopic arm mounted at one end to a structure of the seat unit and wherein the display screen is rotatably mounted to an opposite end of the telescopic arm, such that the display screen can be moved from side-to-side and up and down with respect to the seat, as well as being rotatable and being able to be moved towards or away from the seat via the telescopic action of the arm.

The fifth aspect of the present invention provides a passenger of a seat unit with a display screen that is usable in a variety of positions within the seat unit. As such, a passenger may view the display screen, for example, whilst in a seated, standing, or reclined position.

The screen may be configurable to connect to a personal electronic device such as a tablet or laptop using a wireless or wired connection. The screen may be configurable to connect to an onboard computer using a wireless or wired connection.

The aircraft passenger seat unit may further comprise a stowable table, wherein the table comprises an integrated display screen control device, such as a keyboard or trackpad. The table may be a first table. The display screen control device may be configurable to connect to a personal electronic device such as a tablet or laptop using a wireless or wired connection. The display screen control device may be configurable to connect to an onboard computer using a wireless or wired connection. The table may comprise both a keyboard and a trackpad.

The table may comprise a first surface and a second surface wherein the first surface provides the integrated display screen control device. The table may have a first configuration in which a passenger is able to use the first surface but not the second surface and a second configuration in which the passenger is able to use the second surface but not the first surface. The first surface and the second surface may be substantially the same size. In the second configuration, the second surface may be in a position in which it covers over the first surface. The table may provide the first surface on a first side of the table and the second surface on a second, opposite side of the table, wherein the table is configured to be rotatable so that the user can access the first surface or second surface by rotating the table.

The aircraft seat unit may further comprise a supplementary table, wherein the table is moveable to a position alongside the supplementary table to create an enlarged table surface formed by the table and the supplementary table.

The seat may comprise a seat pan moveable between: a deployed position in which the seat pan occupies a first space and wherein a passenger can sit on the seat pan, and a stowed position in which the seat pan is moved out of the first space such that a passenger can stand in the first space.

According to a sixth aspect, the present invention provides an aircraft cabin comprising a plurality of seat units, wherein the plurality of seat units are seat units according to any of the third, fourth or fifth aspects of the invention. Each seat unit may be adjacent an aisle. The aircraft cabin may have a row extending between two sides of the cabin, the row comprising exactly four seat units, wherein the row of seat units comprises a first seat unit and a second seat unit separated by a first aisle, and a third seat unit and a fourth seat unit separated by a second aisle. The second seat unit and third seat unit may be adjacent and located in the centre of the aircraft cabin.

The seat units according to the second, third, and fourth embodiments of the invention are particularly suited to a 1-2-1 cabin arrangement in which a plurality of rows of seat units are arranged along a longitudinal axis of an aircraft cabin. A privacy screen may be positioned between the second and third seat units. The privacy screen may be moveable between a stowed position and a deployed position, wherein in the deployed position the privacy screen acts as a barrier between the second and third seat units. The aircraft cabin may comprise a longitudinal axis and each seat may be oriented at an angle to the longitudinal axis.

It will of course be appreciated that features described in relation to one aspect of the present invention may be incorporated into other aspects of the present invention. For example, the aircraft passenger seat according to the first aspect of the invention may incorporate any of the features described with reference to the aircraft passenger seat according to the second aspect of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
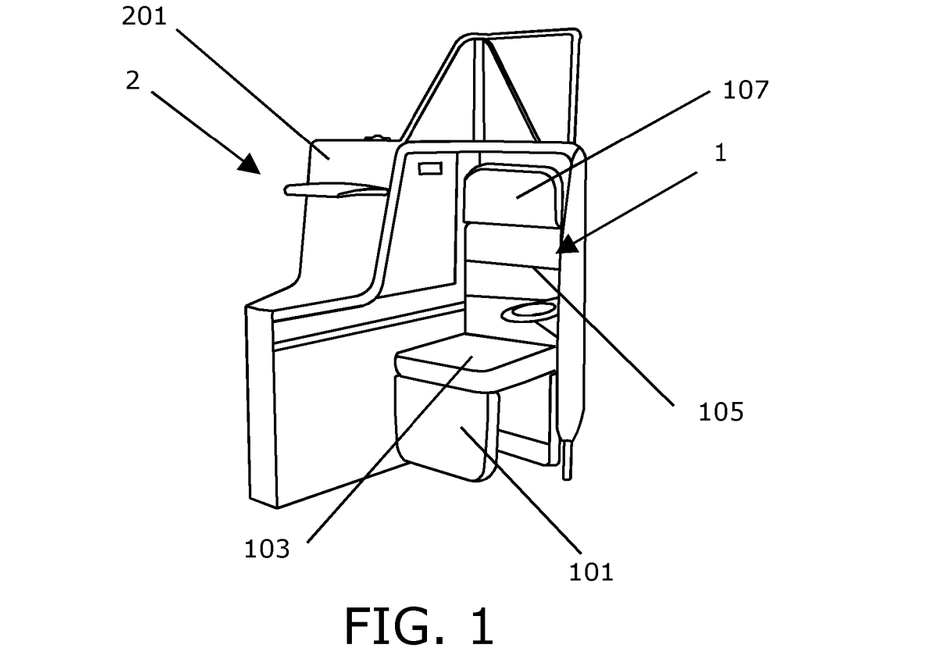
FIG. 1 shows a seat unit comprising an aircraft passenger seat according to an embodiment of the invention wherein the aircraft passenger seat is configured in a deployed, upright seating position.
Figure 2:
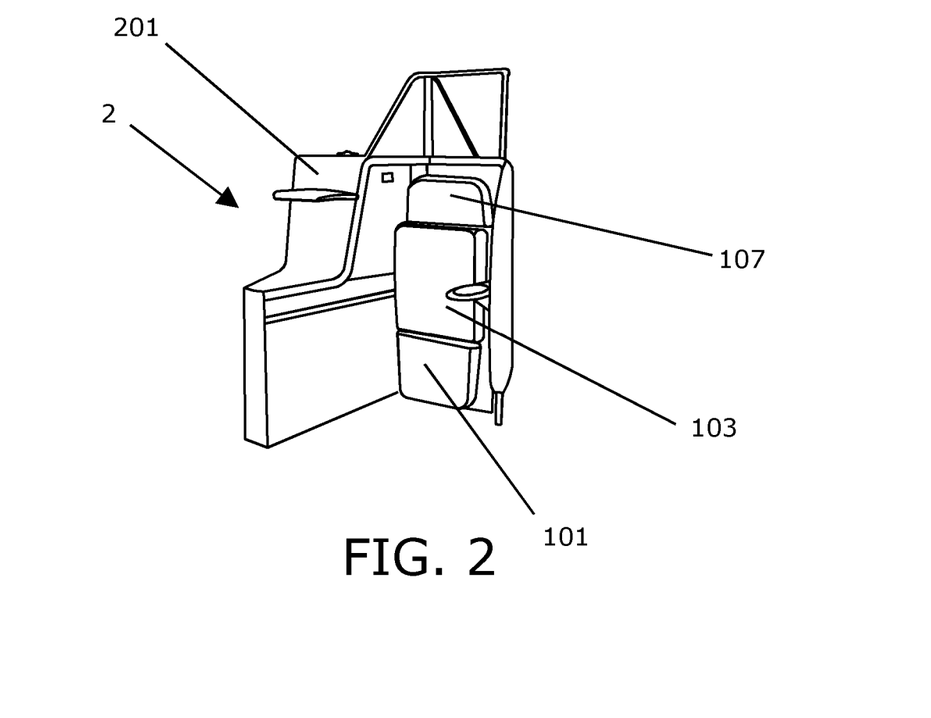
FIG. 2 shows the seat unit of FIG. 1 with the aircraft passenger seat in a stowed, standing position.

An aircraft passenger seat 1 according to an embodiment of the invention is shown situated within a seat unit 2 in FIG. 1. The aircraft passenger seat 1 comprises a leg rest 101, a seat pan 103, a back rest 105, and a headrest 107. The aircraft passenger seat 1 is a sit-stand seat that is moveable between a deployed position in which the seat 1 is configured so that a passenger can sit upon the seat pan 103, as shown in FIG. 1, and a stowed position, as shown in FIG. 2, in which the seat pan 103 and leg rest 101 have been moved from the sitting position so that the passenger occupying the seat unit 2 can stand in a space that is occupied by the seat pan 103 and leg rest 101 when the seat is in the sitting configuration.

Figures 3A, 3B:
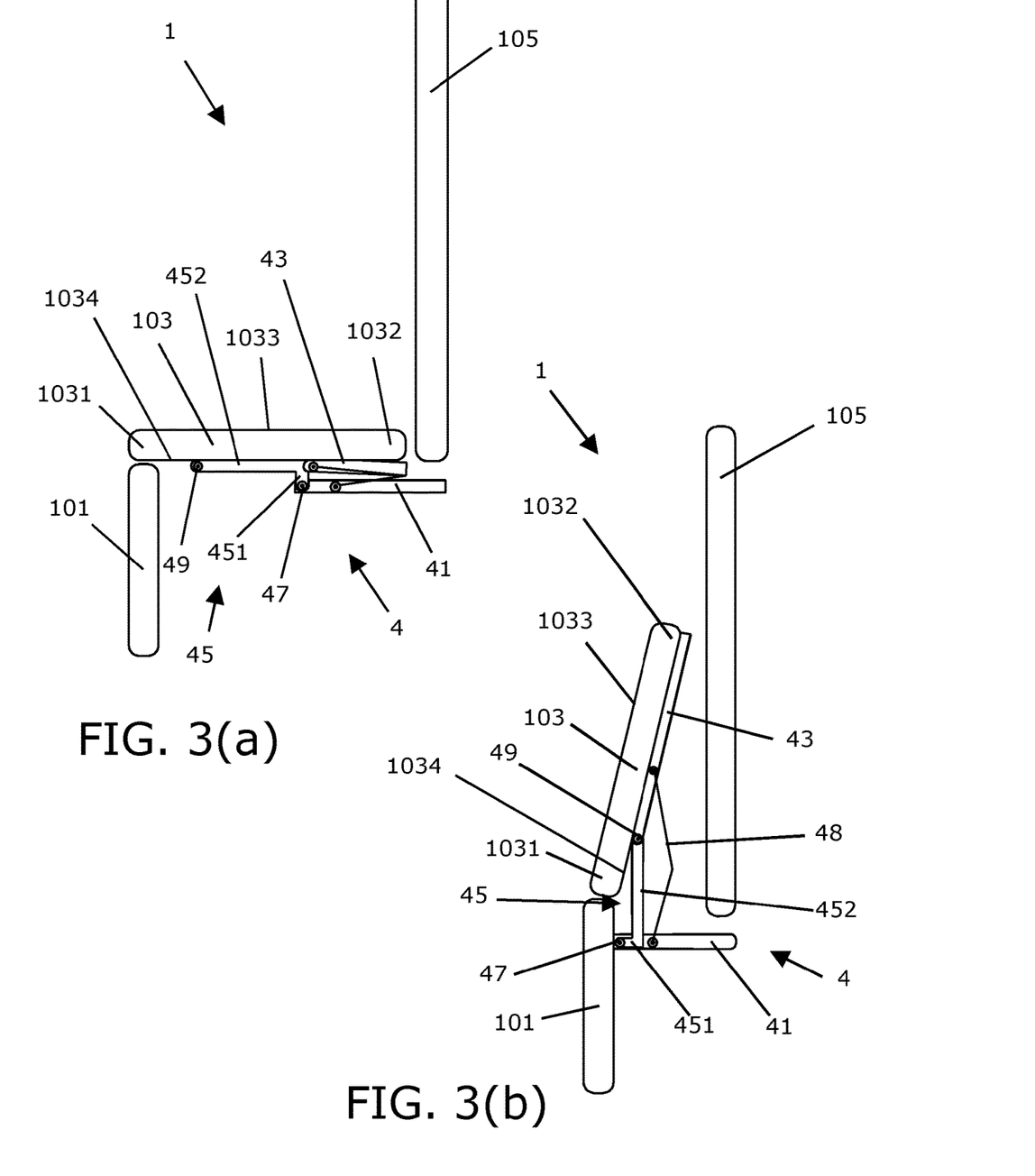
FIG. 3(a) is a schematic view of the aircraft passenger seat and seat folding mechanism with the aircraft passenger seat in the deployed position.
FIG. 3(b) is a schematic view of the aircraft passenger seat and seat folding mechanism with the aircraft passenger seat located between the stowed and the deployed positions.

The mechanism that enables the sit-stand conversion of the seat is shown in more detail in FIG. 3(a), which shows the seat pan 103 in the sitting position, and FIG. 3(b), which shows the seat pan 103 in a position between the sitting position and standing position. As can be seen from FIG. 3(b), the seat pan 103 is configured to pivot about an axis at a pivot point 49 near the front edge 1031 of the seat pan 103, as opposed to a conventional cinema seat-style flip-up seat arrangement that would be configured to pivot from the rear edge 1032 of the seat pan 103, where the seat pan 103 meets the back rest 105.

To move from the deployed position to the stowed position, the seat pan 103 rotates, anticlockwise as shown in FIGS. 3(a) and 3(b), so that the seating surface 1033 of the seat pan 103 moves upwardly and away from the back rest 105 while the underside 1034 of the seat pan (which faces the floor of the aircraft cabin 3 when the seat pan 103 is in the sitting position) moves to face the back rest 105. In the stowed position, the underside 1034 of the seat pan 103 therefore faces the back rest 105, as can be seen in FIG. 2.

The seat pan 103 is configured to move between the deployed position and the stowed position via the linkage arrangement 4 shown in FIGS. 3(a) and 3(b). The linkage arrangement 4 comprises a substructure linkage rod 41 that is fixed upon the aircraft seat 1 substructure (not shown) connected to a seat pan linkage rod 43 that is fixed upon the underside 1034 of the seat pan 103 via an L-shaped pivoting rod 45. The pivoting rod 45 comprises a first arm 451 and a second arm 452 oriented at approximately 90 degrees to one another which together form the L-shape. The distal end of the first arm 451 is pivotally mounted to the substructure linkage rod 41 and the distal end of the second arm 452 is connected to the seat pan linkage rod 42. The seat pan 103 is therefore moveable with respect to the back rest 105 by pivotal movement of the seat pan 103 about a first axis at a first pivot point 47, where the pivoting rod 45 is connected to the substructure linkage rod 41, and by pivotal movement about a second axis at a second pivot point 49, where the pivoting rod 45 is connected to the seat pan linkage rod 43. Such an arrangement enables the seat pan 103 to rotate and move towards the back rest 105 when moving from the deployed position to the stowed position, as will be described in more detail below. The linkage arrangement 4 further comprises a spring 48 connected between the substructure linkage rod 41 and seat pan linkage rod 43 that biases the seat pan 103 towards the stowed position. An actuator arrangement (not shown) is configured to move the seat pan 103 from the stowed position to the deployed position against the resilient bias of the spring 48.

In the deployed position of the seat pan 103, shown in FIG. 3(a), the pivoting rod 45 has been rotated to a position in which the second arm 452 projects away from the back rest 105 and sits alongside the seat pan linkage rod 43, against the underside 1034 of the seat pan 103. In this position the first arm 451 projects downwardly to the substructure linkage rod 41 which, in the deployed position of the seat pan 103, is oriented parallel to the seat pan linkage rod 43 and second arm 452 of the pivoting rod 45.

To move the seat pan 103 from the deployed position to the stowed position, the resilient bias of the spring 48 pushes the seat pan linkage rod 43 away from the substructure linkage rod 41. As this happens, the seat pan 103 pivots through an angle of approximately 180 degrees about the second pivot point 49 in a first direction (anticlockwise as shown in FIGS. 3(a) and 3(b)) while the pivoting rod 45 pivots through an angle of approximately 90 degrees about the first pivot point 47 in a second, opposite direction (clockwise as shown in FIGS. 3(a) and 3(b)). This movement pushes the seating surface 1033 of the seat pan 103 upwardly and away from the back rest 105 into a position in which the seat pan 103 is oriented substantially parallel with the back rest, with the underside 1034 of the seat pan 103 facing the back rest 105, while also translating the seat pan 103 and leg rest 101 towards the back rest 105.

In the stowed position of the seat pan 103, the first arm 451 of the pivoting rod 45 sits parallel with and alongside the substructure linkage rod 41 and projects away from the back rest 105, while the second arm 452 of the pivoting rod 45 projects vertically upwards, perpendicular to the substructure linkage rod 41, with the seat pan linkage rod 43, which rotates by approximately 180 degrees with respect to the pivoting rod 45 when moving from the deployed position to the stowed position, projecting vertically upwards from the distal end of the second arm 452 of the pivoting rod 45.

As can be seen in FIG. 2, in the stowed position the seat pan 103 has moved out of the space that the seat pan 103 occupies when in the deployed position such that a passenger occupying the seat unit 2 can stand in the space that was occupied by the seat pan 103 when the seat pan 103 was in the deployed position. As can be seen from FIGS. 3(a) and 3(b), a benefit of this particular seat folding mechanism is that the leg rest 101 simply moves horizontally towards the back rest 105 as the seat pan 103 moves from the deployed position to the stowed position. If the sit-stand seat 1 were instead to use, for example, a cinema seat-style flip-up arrangement wherein the seat pan 103 was configured to pivot at the rear 1032 of the seat pan 103, the leg rest 101 would move upwardly and away from the back rest 105 before moving back towards the back rest 105 as the seat pan 103 flipped-upwards to a stowed position. This type of flip-up arrangement would therefore require more space for moving the seat 1 between a deployed and stowed configuration and would therefore be particularly inconvenient for a passenger who already has limited space to move within a seat unit 2. Furthermore, a cinema seat-style flip-up arrangement would also require some sort of mechanism to move the leg rest 101 to ensure that standing space is maximised. Therefore the presently disclosed sit-stand mechanism 4 is potentially much simpler than that would be needed for a flip-up-type seat.

Figure 4:
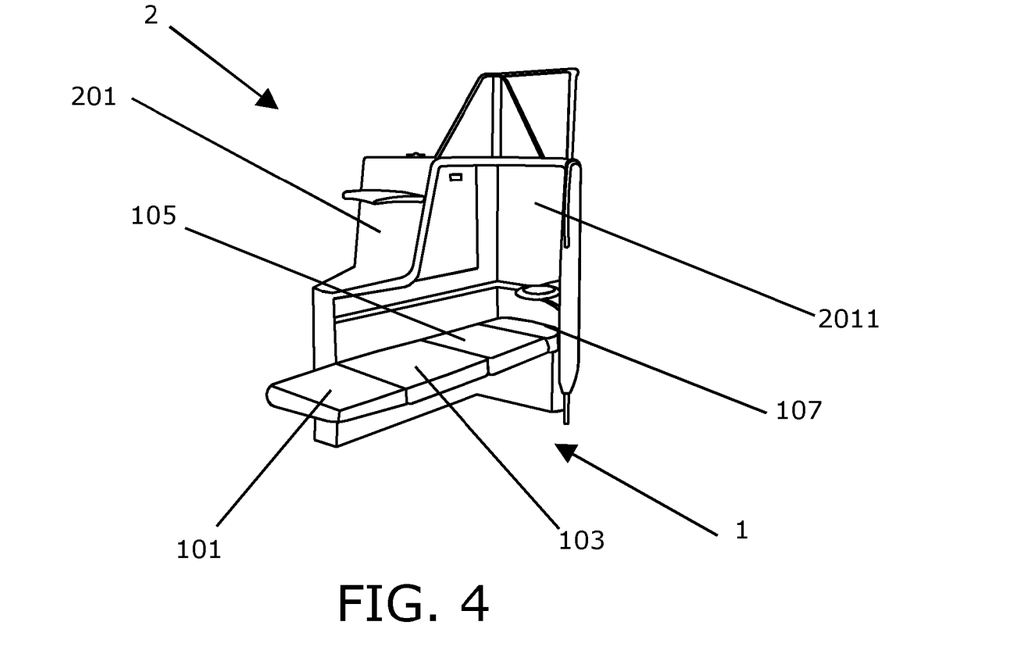
FIG. 4 shows the seat unit of FIG. 1 with the aircraft passenger seat in bed mode position.
Figure 5:
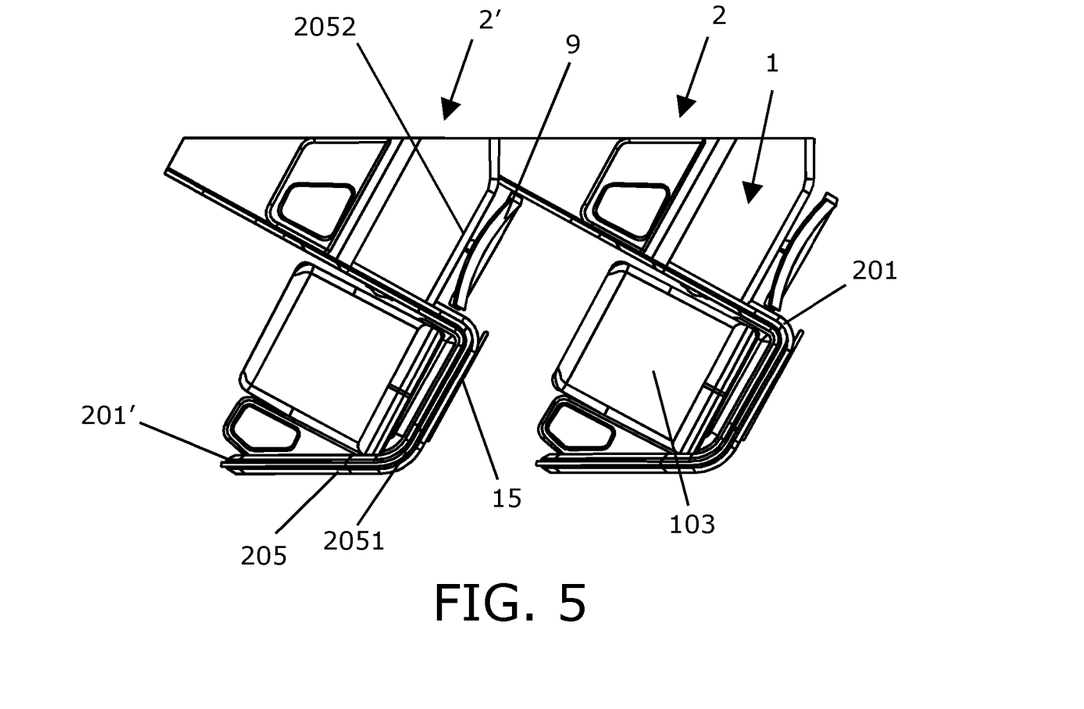
FIG. 5 plan view showing the seat unit of FIG. 1 with a neighbouring seat unit located in front.

In addition to the aircraft seat 1 comprising a sit-stand function, the back rest 105 of the seat is moveable between the deployed, upright seating position, as shown in FIG. 1 and a reclined, bed mode position as shown in FIG. 4 in which the back rest 105 has been moved to a horizontal position in which it is substantially parallel with the deployed position of the seat pan 103 so that the passenger occupying the seat unit 2 can lie flat upon the seat 1. The seat 1 must be able to move between the different configurations of the seat 1 within the relatively confined space of the seat unit 2, a plan view of which is shown in FIG. 5, the seat unit 2 space being bound to the rear of the seat 1 by a seat unit shell 201 and being bound to the front by the seat unit shell 201' of the seat unit 2' in front. To achieve the bed mode position therefore, the seat pan 103 is configured to move forward, away from the rear wall 2011 of the seat unit 2 formed by the shell 201, as the back rest 105 reclines to create space for the horizontal oriented back rest 105 between the seat pan 103 and rear wall 2011. As this happens, the leg rest 101, which is mounted at the front edge 1031 of the seat pan 103, rotates, clockwise as shown in FIGS. 1 and 4, to a position in which the leg rest 101 is also substantially parallel with the deployed position of the seat pan 103. The leg rest 101, seat pan 103, back rest 105, and head rest 107 (which does not rotate relative to the back rest when the seat 1 moves between the sitting configuration and bed mode configuration) therefore form a contiguous horizontal surface in the bed mode configuration of the seat 1.

Figure 6:
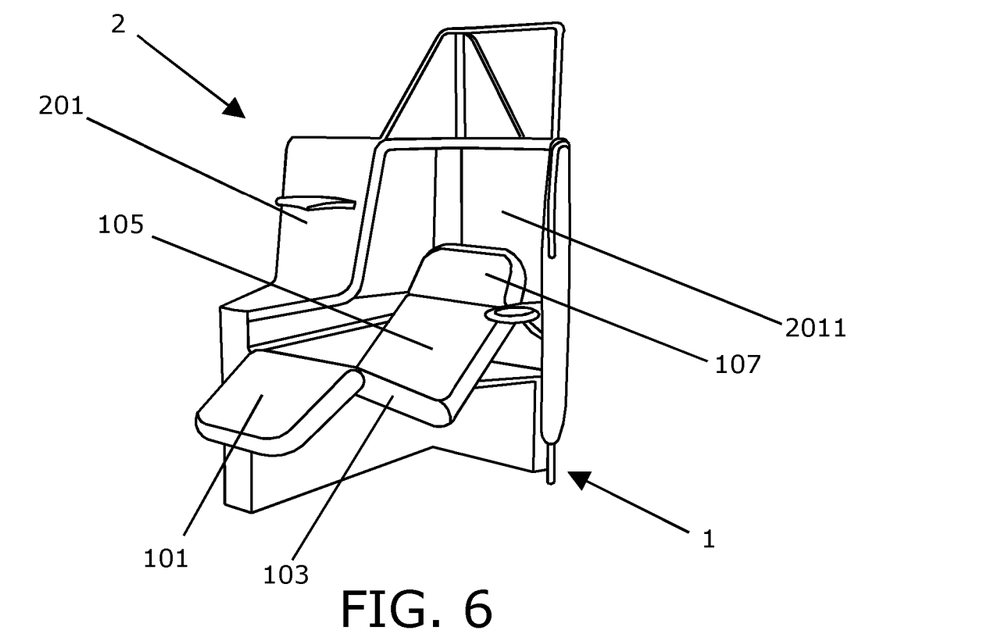
FIG. 6 shows the seat unit of FIG. 1 with the aircraft passenger seat in a zero-gravity seating position.

The seat pan 103 is also rotatable with respect to the back rest at a pivot point located at the rear 1032 of the seat pan 103 so that a passenger sitting in the seat can tilt the seat pan 103 to move their knees upwards or downwards to a desired seating position. Because the leg rest 101, seat pan 103, and back rest 105 are all independently moveable with respect to one another, as well as an upright sitting mode and a bed mode, the seat 1 can be configured in a multiplicity of other modes. For example, the passenger can configure the seat to a "zero-gravity" seating position, as shown in FIG. 6, in which the back rest 105 is reclined, the seat pan 103 is tilted upwards so that the passenger's knees are positioned above their waist, and the leg rest 101 is rotated to a position in which it supports the passenger's lower legs.

The seat unit 2 further comprises display screen 9 for use by the passenger of the seat unit 2. The display screen 9 is rotatably mounted upon a forward wall 205 of the seat unit 2 (the forward wall 205 of the seat unit 2 being formed by the shell 201' of the seat unit 2' in front) via a telescopic arm 13 such that the display screen 9 can be rotated, moved from side-to-side and up and down with respect to the seat 1, as well as being able to be moved towards or away from the seat 1 via the telescopic action of the arm 13. Configured as such the display screen 9 is movable to any position of the seat 1 in which the user wishes to use the display screen 9. For example, in FIG. 7 the user is able to use the display screen in its stowed position to view the display screen 9 from the seat 1 when in an upright seating position; in FIG. 8 the display screen 9 has been moved upwardly so that the display screen 9 can be used by a passenger whilst standing; and in FIG. 9 the display screen 9 has been moved and tilted towards the seat 1 so the display screen 9 can be used by a passenger in the zero-gravity seating position.

Figure 7:
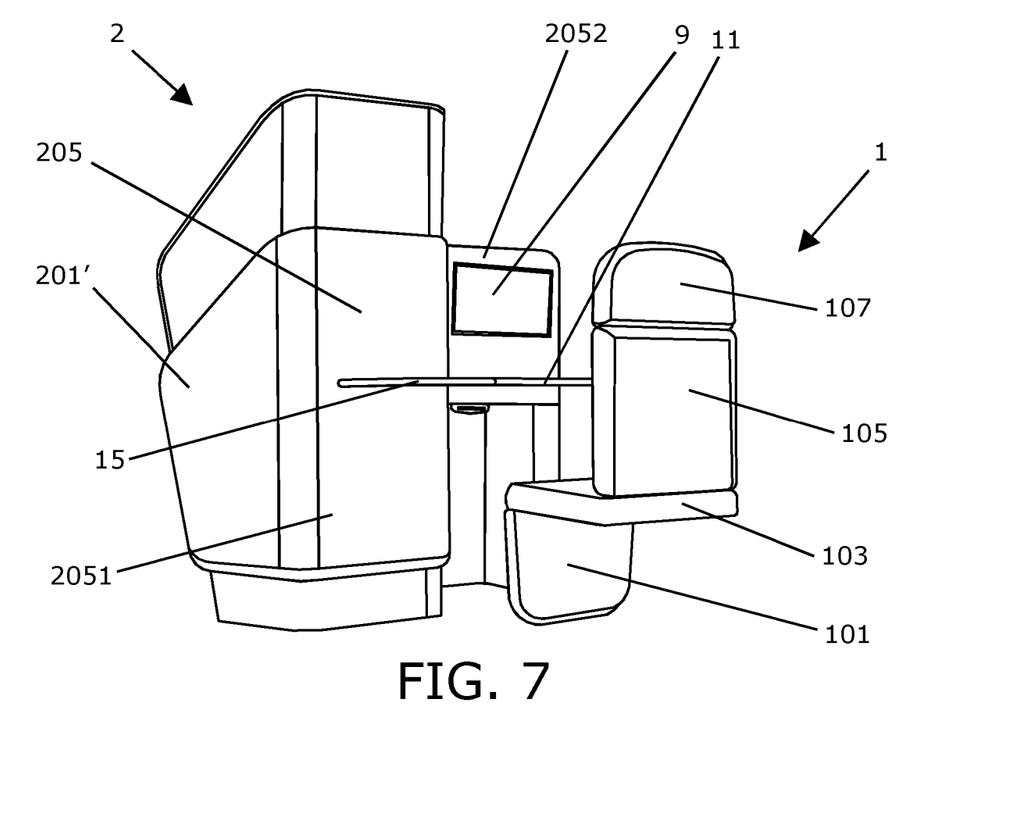
FIG. 7 is a rear view of the seat unit as shown in FIG. 1, with the seat unit shell not shown, and with the forward wall of the seat unit shown.
Figure 8:
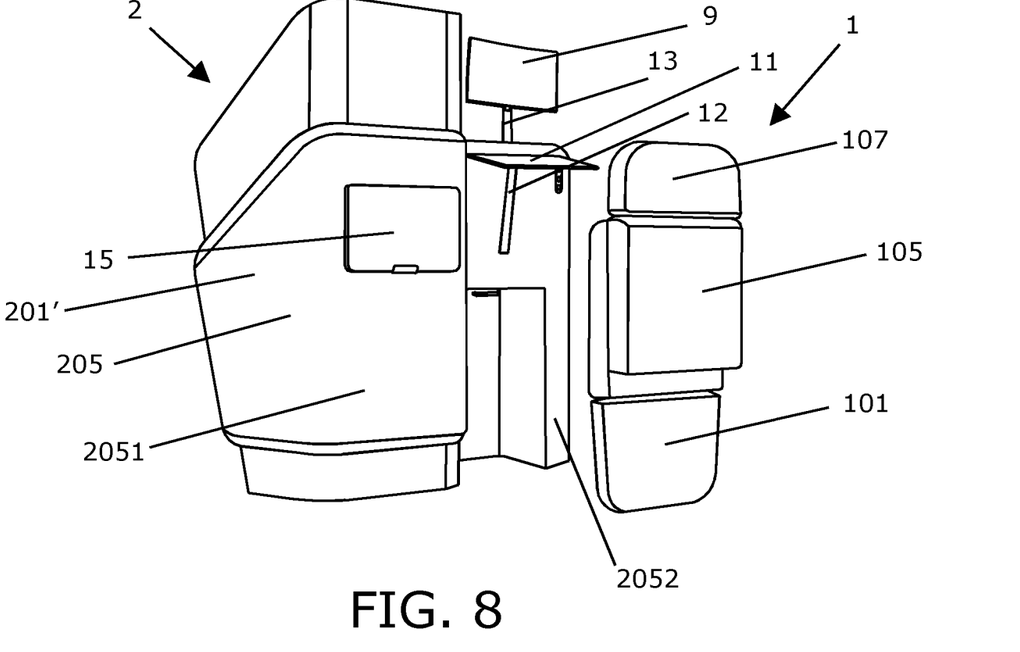
FIG. 8 is a rear view of the seat unit as shown in FIG. 2, with the seat unit shell not shown, and with the forward wall of the seat unit shown.
Figure 9:
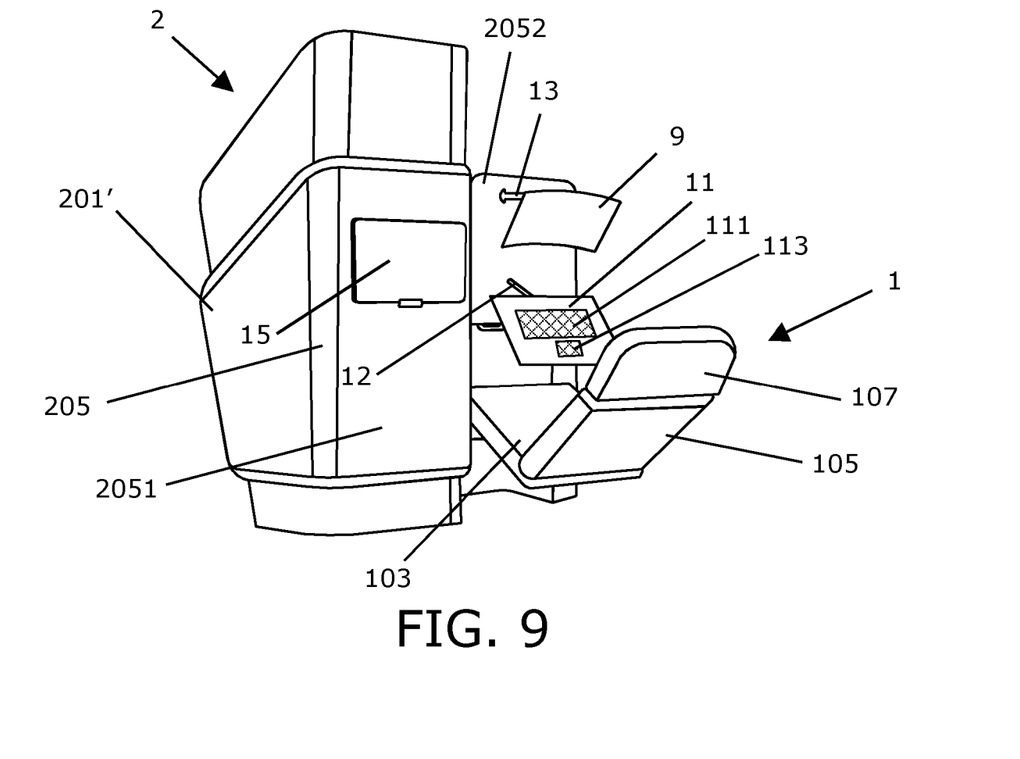
FIG. 9 is a rear view of the seat unit as shown in FIG. 6, with the seat unit shell not shown, and with the forward wall of the seat unit shown.

Mounted to the forward wall 205 of the seat unit, below the display screen is a primary table 11. The primary table 11 comprises an integrated keyboard 111 and track pad 113 that are configured for use with the display screen 9. The display screen 9, keyboard 111 and track pad 113 are configured to connect to either of a personal electronic device belonging to the passenger, such as a tablet or laptop, or to an on-board computer using a wireless or wired connection. The primary table 11 is rotatably mounted via a telescopic arm 12 in substantially the same way as the table such that the table 11, and therefore track pad 111 and keyboard 113, are usable in the various positions of the chair, as shown in FIG. 7, FIG. 8, and FIG. 9. The primary table 11 comprises a table cover (not shown) that can be used to cover the keyboard 111 and track pad 113 should the passenger not need access to the keyboard 111 or track pad 113, or should the passenger want to use the primary table 11 as an eating or working surface.

Figure 10:
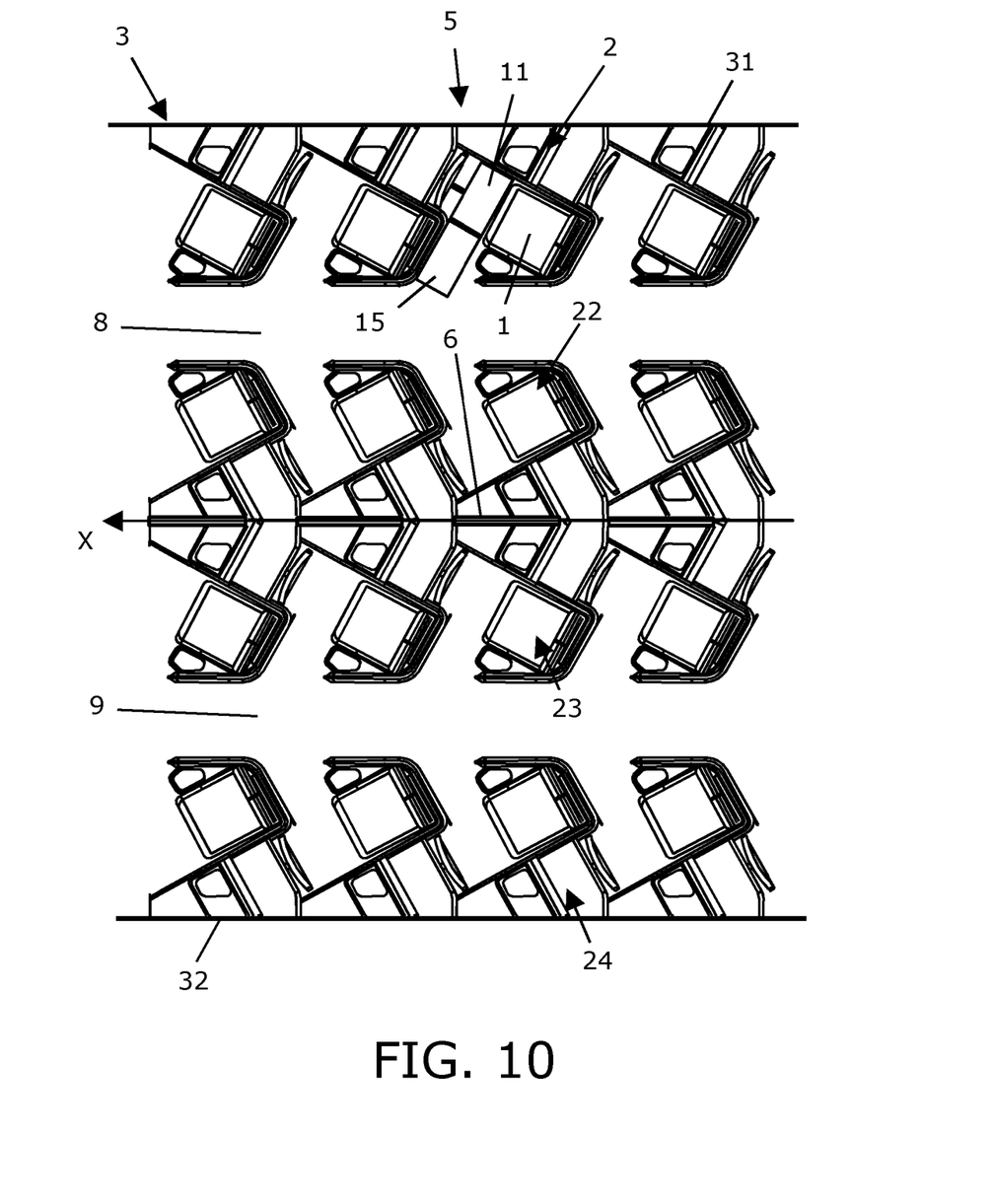
FIG. 10 is a plan view of an aircraft cabin comprising the seat unit of FIG. 1.

As can be seen in FIG. 5, the forward wall 205 of the seating unit is substantially S-shaped and comprises a projecting portion 2051 positioned to a side of the seat 1 that projects in the general direction of the seat 1 and a recessed portion 2052 that is positioned directly in front of the seat 1 so that the leg rest 101 and part of the seat pan 103 is received in the recessed portion 2052 of the forward wall 205 when the seat 1 is in a reclined or bed mode configuration. As can be seen in FIGS. 7, 8, 9, and 10, a secondary, supplemental table 15 is mounted on the projecting portion 2051 of the forward wall 205 to provide the passenger of the seat unit 2 with extra surface space upon which to, for example, work or dine. The secondary table 15 is a hinge-mounted a flip-down table. In the deployed position of the secondary table 15, the primary table 11 can be pulled alongside the secondary table 15, as shown in FIG. 7 and FIG. 10, to create an enlarged contiguous surface for use by the passenger of the seat unit 2.

The seat unit 2 is particularly suited to a 1-2-1 cabin arrangement in which a plurality of rows of seat units 2 are arranged along a longitudinal axis X of an aircraft cabin 3, as shown in FIG. 10. As can be seen, a first row of seat units 5 extends between two sides of the cabin 31, 32 and comprises the seat unit 2 and a second seat unit 22 separated by a first aisle 8, and a third seat unit 23 and a fourth seat unit 24 separated by a second aisle 9 wherein the second seat unit 22 and third seat unit 23 are adjacent in the centre of the aircraft cabin 3. Each of the seat units are oriented such that each seat is oriented at an angle to the longitudinal axis X. A lowerable privacy screen 6 is positioned between the second seat unit 22 and third seat unit 23 that can be raised to act as a barrier between the seat units 22, 23 or lowered should the passengers sat in those seat units 22, 23 be travelling together and not wish to be separated.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft passenger seat comprising a seat pan, a back rest, and a leg rest,
   wherein the back rest is moveable between an upright position and a reclined position in which the back rest is substantially parallel with a deployed position of the seat pan;
   wherein the leg rest is moveable between a retracted position in which the leg rest is substantially perpendicular to the deployed position of the seat pan and an extended position in which it is positioned to support the legs of a passenger;
   wherein the seat pan is moveable between:
   the deployed position in which the seat pan occupies a first space and wherein a passenger can sit on the seat pan, and
   a stowed position in which the seat pan is moved out of the first space such that a passenger can stand in the first space;
   wherein the back rest can be fixed in at least one intermediate position between the upright position and the reclined position;
   wherein the seat pan is moveable between the deployed position and a tilted position in which seat pan is angled with respect to the back rest and the seat pan is fixable in the tilted position; and
   wherein the seat pan comprises a seating surface on a first side of the seat pan and an underside on a second, opposite side of the seat pan, and wherein the aircraft seat is configured such that:
   in the deployed position a rear edge of the seat pan is adjacent the back rest, and
   in the stowed position the underside of the seat pan faces the back rest, and
   wherein the seat pan is configured to move from the deployed position to the stowed position by rotating the seat pan about an axis positioned towards or at a front edge of the seat pan such that the rear edge of the seat pan moves away from the back rest, and
   wherein the leg rest is substantially aligned with the seat pan and positioned below the seat pan when the seat pan is in the stowed position.

2. An aircraft passenger seat according to claim 1, wherein the leg rest can be fixed in at least one intermediate position between the retracted position and the extended position.

3. An aircraft passenger seat according to claim 1, wherein the leg rest is rotatably mounted to the seat pan and moveable between the retracted position and the extended position by rotation of the leg rest with respect to the seat pan.

4. An aircraft passenger seat according to claim 1, wherein the seat pan can be fixed in at least one intermediate position between the deployed position and tilted position.

5. An aircraft passenger seat according to claim 1, wherein:
- the seat pan can be fixed in a plurality of positions between the deployed position and the tilted position,
- the back rest can be fixed in a plurality of positions between the upright position and the reclined position, and
- the leg rest can be fixed in a plurality of positions between the retracted position and the extended position.

6. An aircraft passenger seat according to claim 1, wherein the leg rest is mounted to the seat pan, in a region of the front edge of the seat pan.

7. An aircraft passenger seat unit comprising an aircraft passenger seat according to claim 1.

8. An aircraft passenger seat unit according to claim 7 further comprising a table, wherein the table is moveable between:
- a lowered position in which a passenger can use the table while sitting upon the seat pan, and
- a raised position in which the passenger can use the table while standing in the first space.

9. An aircraft passenger seat unit according to claim 8, wherein the table comprises an integrated display screen control device, such as a keyboard or trackpad.

10. An aircraft passenger seat unit according to claim 9, wherein the table comprises a first surface and a second surface and wherein the first surface provides the integrated display screen control device, the table having a first configuration in which a passenger is able to use the first surface but not the second surface and a second configuration in which the passenger is able to use the second surface but not the first surface.

11. An aircraft seat unit according to claim 10 further comprising a supplementary table, wherein the table is moveable to a position alongside the supplementary table to create an enlarged table surface formed by the table and the supplementary table.

12. An aircraft passenger seat unit according to claim 7 further comprising a display screen and a telescopic arm, wherein the telescopic arm is mounted at one end to a structure of the seat unit and wherein the display screen is rotatably mounted to an opposite end of the telescopic arm, such that the display screen can be moved from side-to-side and up and down with respect to the seat, as well as being rotatable and being able to be moved towards or away from the seat via the telescopic action of the arm.

13. An aircraft cabin comprising a plurality of seat units, wherein the plurality of seat units are seat units according to claim 7.

14. An aircraft cabin according to claim 13 having a row extending between two sides of the cabin, the row comprising exactly four seat units, wherein the row of seat units comprises a first seat unit and a second seat unit separated by a first aisle, and a third seat unit and a fourth seat unit separated by a second aisle.

* * * * *